Nov. 18, 1952 — E. J. MEROW — 2,618,410
MILK WEIGHING AND HANDLING APPARATUS
Filed Dec. 13, 1949 — 3 Sheets-Sheet 1

Inventor
Edward J. Merow
Attorney

Nov. 18, 1952    E. J. MEROW    2,618,410
MILK WEIGHING AND HANDLING APPARATUS
Filed Dec. 13, 1949    3 Sheets-Sheet 2
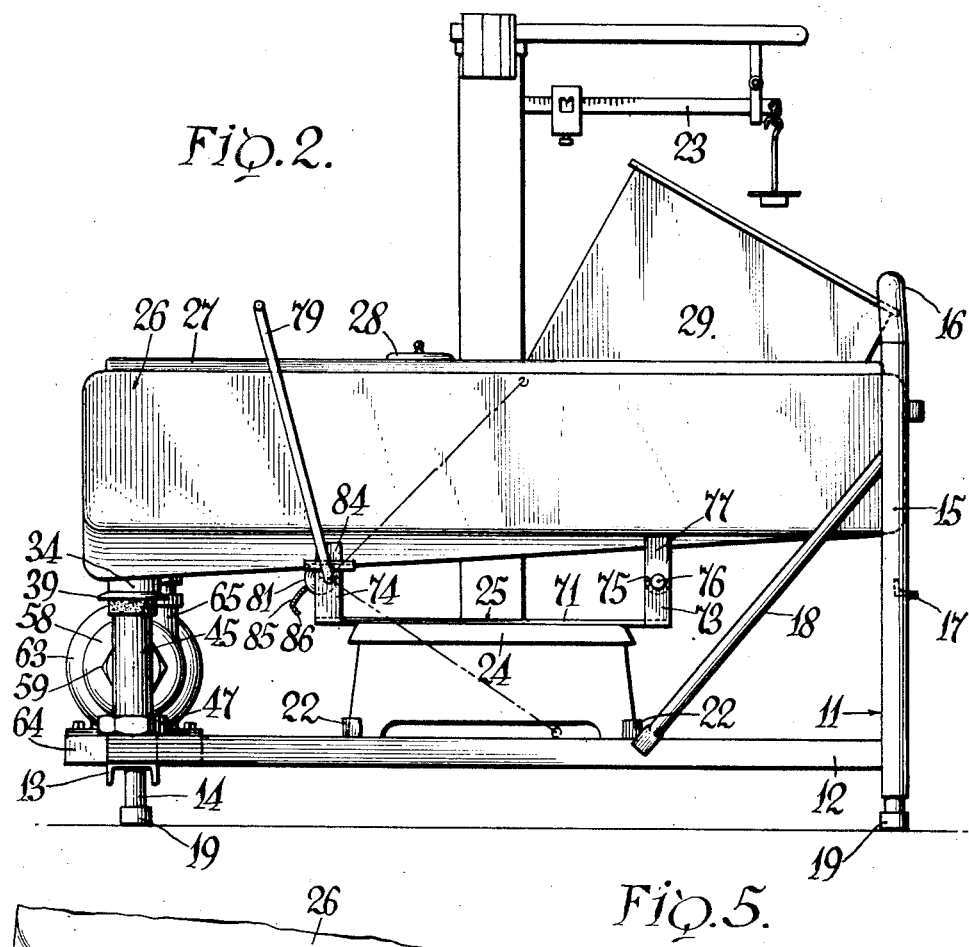
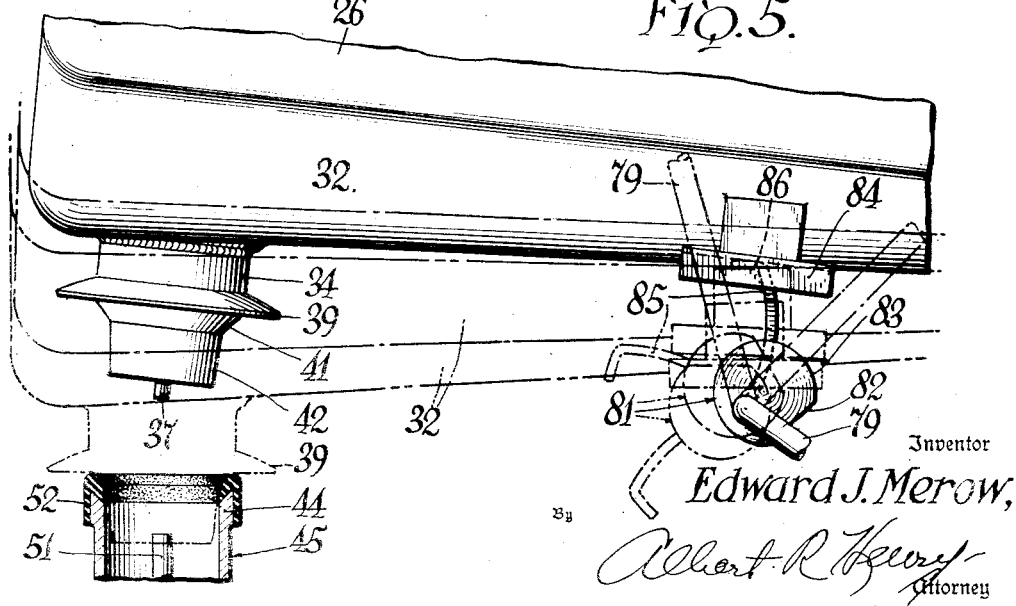
Inventor
Edward J. Merow,
By
Albert R. Henry
Attorney Nov. 18, 1952  E. J. MEROW  2,618,410
MILK WEIGHING AND HANDLING APPARATUS
Filed Dec. 13, 1949  3 Sheets-Sheet 3
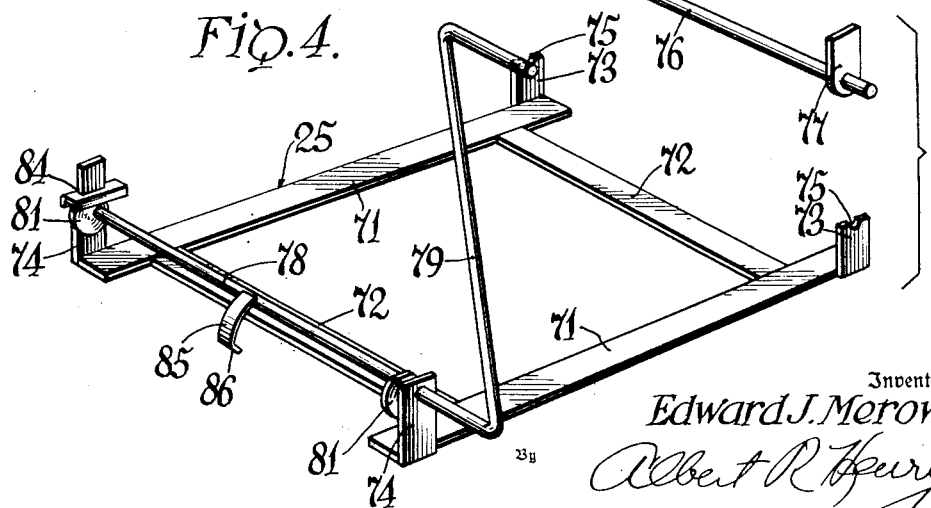
Inventor
Edward J. Merow,
Albert R. Henry
Attorney Patented Nov. 18, 1952

2,618,410

UNITED STATES PATENT OFFICE 2,618,410

MILK WEIGHING AND HANDLING APPARATUS

Edward J. Merow, Little Valley, N. Y., assignor to Purity Manufacturing Company, Inc., Cattaraugus, N. Y.

Application December 13, 1949, Serial No. 132,667

6 Claims. (Cl. 222—125)

This invention relates to apparatus for weighing and handling fluids such as milk, and it has particular reference to the provision of a valved tank and a support therefor adapted to be mounted on a weighing scale so that the milk may be weighed, and which tank may thereafter be shifted with respect to its support to deliver the contents to a conduit or pump through which the milk may be transferred to another processing point.

It is customary in the dairy industry to deliver milk produced on a number of farms to a central station, where each farmer's contribution may be weighed and analyzed to determine its value, and where the milk may be further treated. The weighing operation may be done by pouring the milk into a tank resting on a platform scale, and which is of sufficient size to hold the entire lot which any producer may bring in his own set of cans. The present invention is concerned with an improved weighing apparatus, including a valved tank adapted to be movably mounted on a support which retains the tank in one position during the weighing operation, and which can be actuated to shift the tank and automatically open the valve when it is desired to remove the milk for further treatment.

The invention has generally for its objects the provision of a simplified and accurate milk weighing apparatus, adapted for use in both small and large dairies, which may be readily cleaned, and which may alternately be freely supported upon the platform of a weighing scale or connected to a discharge line through which the weighed milk is removed. In a preferred embodiment of the invention, these purposes are attained by providing a weighing and receiving tank with a normally closed valve, and mounting the tank for limited movement on a cradle positioned on the scale. In one position, the tank is freely mounted on the scale and the valve is closed, so that the milk may be retained and weighed. In another position, the tank is shifted relative to a discharge line in such fashion as to connect the line to the tank and concurrently open the valve, so that the tank contents may be withdrawn. In a further position which the tank may assume, the valved outlet and the discharge line are relatively widely spaced so that the parts are readily accessible for cleaning.

Other features and advantages of the invention will be apparent from the following detailed description of a preferred embodiment, illustrated in the accompanying drawing, wherein:

Fig. 2 is a side elevation;

Fig. 3 is an end view;

Fig. 4 is a perspective of the tank supporting cradle and the tank rock shaft;

Fig. 5 is an enlarged fragmentary view of the discharge end of the tank when elevated for cleaning, the broken lines indicating other positions which the tank may assume; and, Fig. 6 is an enlarged fragmentary section through the tank outlet and discharge conduit shown in the position assumed at the time of discharging the tank contents.

Figure 1:
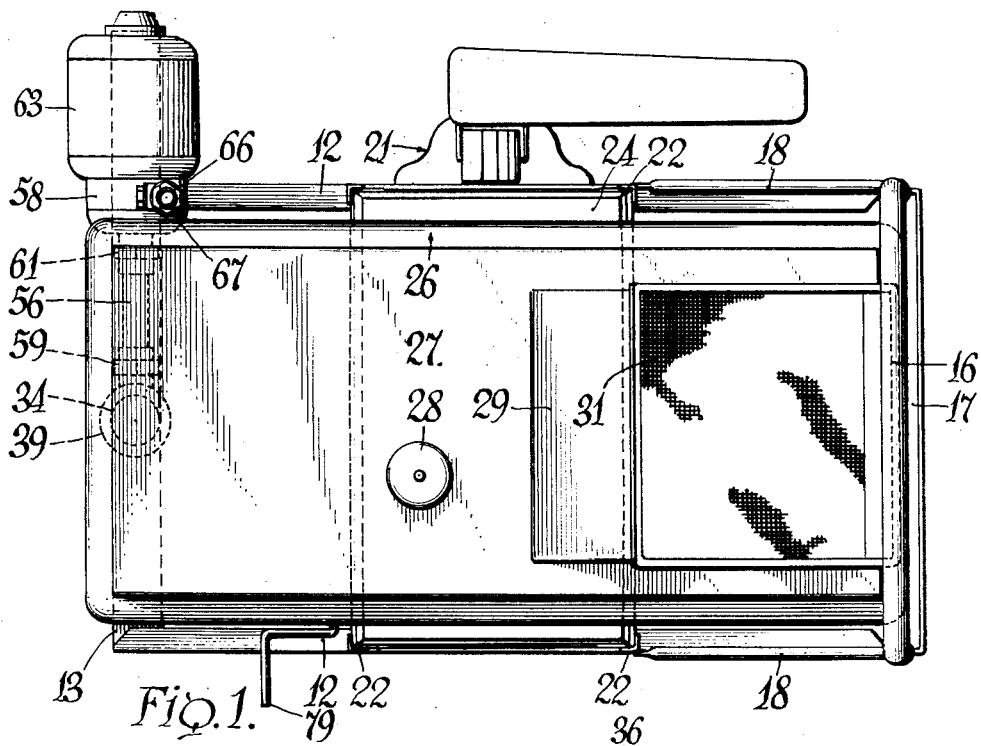
Fig. 1 is a top plan of the apparatus.

Referring first to Figs. 1, 2, and 3, the apparatus comprises a substantially rectangular frame 11 formed of side rails 12 and end rails 13, which may be of angle or channel section steel and welded together. The frame is supported at its corners by short legs 14 at one end and long legs 15 at the opposite end, the legs 15 being connected at their upper extremities by a cross bar 16 which serves as a milk can support when milk is being poured into the apparatus for weighing. A cross brace 17 serves to strengthen the tall end of the frame, and diagonal struts 18 may also be welded between the legs 15 and the side bars 12 to impart additional rigidity. The brace 17 is clearly shown in Fig. 2, but it has been intentionally omitted from Fig. 3 to avoid obscuring the illustration of other parts. The frame 11 need be elevated but a few inches above the floor line, and the bottoms of the legs 14 and 15 may be fitted with telescoping feet 19, adjustably secured in any desired position, so that the frame may be leveled on the receiving station floor.

A platform scale 21 is mounted on and between the side rails 12, and it is properly centered or located with respect to other components by retainer lugs 22 connected to the frame. The scale is so positioned that its beam 23 projects beyond the frame and extends lengthwise thereof, so that it is readily accessible for manipulation. The platform 24 of the scale 21 has directly positioned thereon a cradle, generally designated by the reference numeral 25, and presently to be described in detail, which supports a weighing tank 26. The tank 26 is a generally rectilinear closed vessel having a removable top cover 27 provided with an opening covered by a lid 28 which may be removed to obtain a sample of milk for analysis. An angularly inclined chute 29 extends from one end of the cover 27 to a region just below the cross bar 16 of the frame, and it provides an inlet through which milk may be dumped from the farmer's cans into the tank. Dirt particles and like foreign matter are separated from the milk by a screen 31 placed over the mouth of the chute.

The bottom 32 of the tank 26 tapers both toward the center line of the tank and the end remote from the chute 29. The low portion of the tank bottom is formed with an opening 33 (see Fig. 6) in which is secured a drain member 34, which in this case is formed as a valve body. The inner end of the body 34 is ground to provide a conical valve seat 35 for a valve element 36, which is formed with a stem 37 extending lengthwise of the body and passing through a central guide opening of a spider 38 within the bore of the body. The outer surface of the body 34 is provided with a drip flange 39, which prevents moisture condensing on the tank 26 from draining into or around the end of the body, and the lower portion is formed with a tapered shoulder 41 which merges into a reduced end 42.

Figure 6:
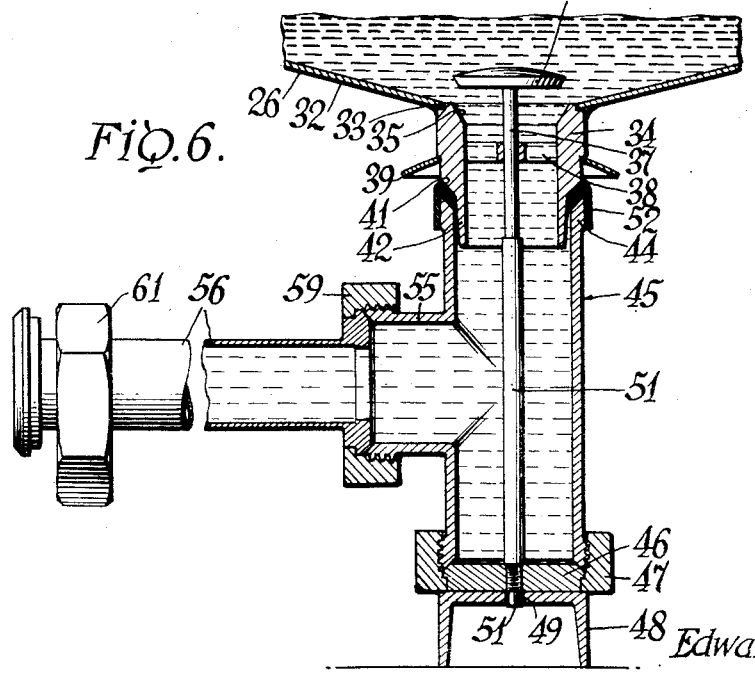

As shown in Figs. 2, 3, and 6, the end 42 of the body 34 is telescopically positioned within the upper end 44 of a vertically disposed T fitting 45. The fitting 45 is provided with a shouldered cap 46 at its opposite end, which is retained in position by a flange nut 47 to provide a fluid tight joint. The cap and nut rest on a block 48 connected to the adjacent end rail 13, and the block 48 is formed with an aperture 49 which loosely receives the projecting reduced end of a rod 51, extending axially of the fitting 45 and formed with a threaded section screwed into a tapped aperture in the center of the cap 46. The upper end 44 of the fitting is beveled, and is supplied with a gasket ring 52, which forms a seal with the tapered shoulder 41 when the parts are in the position shown in Fig. 6. In this position, the upper end of the rod 51 abuts the end of the valve stem 37, to lift the valve element 36 from its seat, thus permitting the contents of the tank 26 to drain.

The branch 55 of the fitting 45 is internally beveled and externally threaded to receive one end of a coupling sleeve 56, the other end of which is connected to the inlet 57 of a pump 58. Flange nuts 59 and 61 are employed to make the indicated connections. Inasmuch as the fitting 45 must frequently be removed for cleaning and sterilizing, the connection to the pump is advantageously of a quick detachable type, and the end of the rod 51 fits loosely in the aperture 49, so that the connections may be readily made without injuring the seats on the branch 55 and sleeve 56. The purpose of the loose connection to the block 48 is to bring the fitting 45 into proper alignment with the valve body 34, so that the reduced end 42 may move substantially axially of the fitting 45 without contact between the walls.

The pump 58, and its driving motor 63, are advantageously mounted on a block 64 which is welded to the adjacent rail 13. The pump is herein shown as being of the centrifugal type, having an upwardly extending discharge nipple 65 which is connected to a discharge line 66 through a check valve 67. The line 66 leads to any suitable point, such as a large tank, not shown, in which the various lots of milk may be stored after having been weighed. Automatic control means of an obvious nature may be provided, if desired, to operate the pump motor 63 only when the tank valve body 34 is seated in the upper end of the fitting 45.

Reference has been made to the mounting of the tank 26 on a cradle 25 which is positioned on the scale platform 24. This cradle, as best shown in Fig. 4, comprises a rectilinear frame formed of interconnected side bars 71 and cross bars 72, and upstanding bearing blocks 73 and 74 respectively which are disposed at the ends of the side bars 71. The blocks 73 are formed at their upper ends with open or half bearings 75, to support a transverse shaft 76 which passes through brackets 77 that are welded to the bottom of the tank 26 adjacent the inlet end thereof. The bearing blocks 74 are formed with full bearings to receive a rotatable shaft 78, one end of which extends beyond the side of the tank 26, and is bent to form a crank handle 79.

The shaft 78 is provided, adjacent the bearings 74, with cams 81 formed with flat portions 82 and eccentric curved portions 83, which may alternately engage follower blocks 84 welded to the bottom 32 of the tank 26 adjacent the discharge end thereof. It will be apparent that, as the crank 79 and shaft 78 are rotated, the cams 81 will cause the valved end of the tank 26 to be elevated or lowered, depending upon the direction of rotation. The shaft 78 is also provided, at the region beneath the medial axis of the tank, with a high lift cam 85 having a support portion 86 at the end thereof. When the cam 85 engages the bottom 32 of the tank 26, the tank will be elevated to an extent greater than the elevation imparted by the eccentric portions 83 of the cams 81.

Referring also to Fig. 5, it will be seen that, in the full line position, the handle 79 has been rotated to the right or clockwise sufficiently to cause the cam portion 86 to engage the tank bottom 32, and to elevate the tank 26 sufficiently to cause the valve body 34 to be entirely clear of the fitting 45. In this position, the valve element 36 is seated by gravity, and the fitting 45 and sleeve 56 may be disconnected for cleaning. It will further be noted that the support portion 86 of the cam 85 is so formed as to be self locking. That is to say, the weight of the tank 26 on the cam 85 tends to hold the cam in a dead center position, or even tends to force it further in a clockwise direction. This, however, will not occur, as the weight of the tank itself will resist the tendency, and the crank portion 79 of the shaft 78 may be so dimensioned as to abut the side rail 12 at this time to provide a limit stop. In Fig. 2, this crank position is indicated by the dash and double dot line.

When it is desired to weigh a batch of milk, the handle 79 is swung counterclockwise to the position indicated by the dash and single dot lines in Figs. 2 and 5. The cam 85 is then disengaged from the bottom 32 of the tank 26, but the eccentric portions 83 of the cams 81 then contact the follower blocks 84. The lower portion 42 of the valve body 34 then partially enters the bore of the fitting 45, but due to its reduced diameter and the very small eccentricity about the rock shaft 76, it does not contact or rub against the fitting, nor does the rod 51 engage the valve stem 37. The valve accordingly remains closed to retain the milk in the tank. Here again, the cams 81 are so formed and are so mounted on the shaft 78 that the gravitational or weight component of force acts substantially normally through the axis of the shaft, and the cams will therefore remain in place automatically to retain the tank in the desired position without employing auxiliary latches.

During the weighing operation, the tank 26 and cradle 25 will have a slight vertical motion, but, by reason of the clearance between the end of the valve body 34 and the bore of the fitting 45, there is no interference which would cause an error in the measurement. After the milk has been sampled and weighed, the crank 79 is moved farther to the left, to lower the tank 26 through engagement of the followers 84 with the flat portions 82 of the cams 81. As the reduced end 42 of the valve body 34 enters farther into the fitting 45, the end of the valve stem 37 strikes the end of the rod 51, thus opening the valve and placing the tank 26 in communication with the pump 58. At this time, the tapered shoulder 41 on the valve body 34 engages the sealing ring 52, which is of resilient material, and so much of the weight of the tank as is applied to the ring 52 presses it tightly between the body 34 and fitting 45, thereby making a fluid tight joint.

As previously noted, provision may be made to start the pump 58 concurrently with the seating of the valve body 34 in the fitting 45. It may also be noted that the flat cam surfaces 82 remain in engagement with the follower blocks 84 to take most of the weight of the low end of the tank 26, just enough force being applied to the gasket 52 to form a tight joint without injury to the parts. The tank 26 may be readily cleaned by removing the top cover 27, and, when the tank is in its most elevated position, the cleaning solutions may be readily drained by manually operating the tip of the valve stem 37 which projects below the valve body 34 when the element 36 is seated.

It will accordingly be seen that the invention provides a simple and effective apparatus for weighing and transferring batches of milk or other liquids. One important advantage of the present invention is that the milk may be delivered directly from the tank to the pump, fluid communication being established merely by moving the tank slightly to couple the tank outlet with the pump inlet, and concurrently open the drain valve. It has heretofore been proposed to provide, in addition to a tank which could be placed on the scale, a second tank into which the weighed milk could later be transferred, it being thought that such second tank was necessary to provide for accurate weighing. The present invention makes such second tank unnecessary, and thereby greatly simplifies the apparatus and also materially reduces its cost.

While the invention has been described with respect to a single embodiment, it will be apparent to those skilled in the art that numerous modifications and alterations may be made without departure from its principles. It is therefore intended to encompass all such adaptations as fall within the scope of the following claims.

I claim:

1. Apparatus of the character described comprising a tank adapted to receive quantities of liquid to be weighed, an outlet formed in the bottom of the tank, a valve in the outlet, a discharge fitting below the valved outlet, said outlet being formed with a depending portion adapted to enter the fitting, a cradle for supporting the tank, shiftable cam means on the cradle and engaging the tank to move the outlet end thereof with respect to the fitting and to cause the depending portion to move substantially vertically with respect thereto, a valve actuating rod in the fitting, said rod engaging said valve to open the same when the cam means is shifted to one position to move the outlet downwardly into the fitting, said rod releasing said valve when the cam means is shifted to another position to raise the outlet, and sealing means between the fitting and outlet adapted to seal the joint therebetween when the cam means is shifted to said one position.

2. Apparatus of the character described comprising a tank adapted to receive quantities of liquid to be weighed, a sloping bottom on the tank, an outlet formed at the low part of the bottom, said outlet having a depending portion, a valve positioned in the outlet and normally biased to closed position, a drain fitting below the outlet and in alignment therewith, a cradle for supporting the tank, said cradle including cam means engaging the bottom of the tank, said cam means being shiftable to move the outlet substantially vertically with respect to the drain fitting, the depending portion of the outlet being telescopically entered into the fitting when said cam means is shifted to lower the outlet its maximum extent, the internal diameter of the fitting being sufficiently greater than the external diameter of the depending portion that there is clearance therebetween, an actuating rod positioned in the fitting and engaging said valve to open the same when said depending portion is lowered its maximum extent, said rod and valve being spaced when the cam means is shifted to elevate the outlet, and a sealing gasket interposed between the fitting and depending portion and mutually engaged thereby when the outlet is lowered its maximum extent.

3. Apparatus of the character described comprising a tank adapted to receive quantities of liquid to be weighed, an outlet in the bottom of the tank, a valve in the outlet, said valve being formed with a depending stem, a drain fitting below the outlet and in alignment therewith, said outlet having a depending portion surrounding the valve stem and adapted to enter the drain fitting with clearance between the walls thereof, a cradle for supporting the tank, said cradle and tank being formed with bearing means whereby the tank may be rocked around the axis of said bearing means to cause the depending portion to move with respect to the fitting, said bearing means being spaced from the depending portion and fitting whereby said depending portion may enter the fitting with substantially vertical movement and insufficient eccentricity to cause said portion to rub against the fitting, cam members interposed between the tank and cradle, an operating rod to shift the cam members and thereby rock the tank about said bearing means, said cam members having a low part enabling the depending portion of the outlet to enter the fitting to a maximum extent, a rod positioned in the fitting and engaging the stem of the valve when said depending portion enters the fitting to its maximum extent to thereby open the valve, said cam members having a second part partially elevating the depending portion with respect to the fitting a sufficient distance to separate the valve stem and rod while maintaining concentric alignment between the depending portion and fitting, said cam members having a third part elevating the depending portion above the fitting and rendering the fitting freely accessible for cleaning.

4. Apparatus of the character described comprising a tank adapted to receive a quantity of liquid to be weighed, a sloping bottom on the tank, an outlet at the low part of the bottom, a drain fitting positioned below the outlet and in alignment therewith, a cradle supporting the tank, a shaft and bearings interposed between the cradle and tank and spaced from the fitting whereby the tank outlet may be shifted above the fitting in a substantially vertical direction, cam means interposed between the tank bottom and cradle, a cam shaft for rotating the cam means and thereby elevating the outlet of the tank varying distances above the drain fitting, a valve in the outlet, said valve being biased to closed position, an actuating rod in the fitting adapted to engage the valve to open the same when the cam means is rotated to one extreme low position, said valve and rod being separated when the cam means is rotated to other positions, said cam means supporting the major portion of the weight of the tank in all positions, said cam means having an extreme high lift position and an intermediate position, the surfaces of said cam means being so formed that the thrust of the weight of the tank thereon at extreme and intermediate positions is substantially normal to the axis of the cam shaft, whereby the cams will remain in said positions until intentionally moved.

5. Apparatus of the character described comprising a tank adapted to receive quantities of liquid to be weighed, said tank being formed with a bottom sloping toward one end and also toward the center of the tank, an outlet in the bottom of the tank at the low region of the bottom, said outlet having a depending portion, a valve in the outlet having a stem extending through the depending portion, said valve being normally seated, a cradle supporting the tank, said cradle and tank bottom being interconnected by a transverse horizontal shaft and bearings at a region remote from the outlet, said cradle and tank being interconnected adjacent the outlet by a transverse horizontal shaft and cams mounted on the shaft, said cams having flat, eccentric, and high lift portions, a discharge fitting positioned beneath the tank outlet and in substantial vertical alignment therewith when the cams engage through their flat and eccentric portions, said fitting having an internal diameter greater than the external diameter of the depending portion of the fitting whereby said depending portion may move telescopically in the fitting in spaced relation to the wall thereof, an actuating rod in the fitting adapted to engage the valve stem and open the valve when the cams engage through the flat portion, said rod and stem being separated when the cams engage through eccentric and high lift positions, said cams when engaged through the high lift position elevating the tank outlet above the fitting to render said fitting and valve stem manually accessible.

6. Apparatus of the character described comprising a tank adapted to receive quantities of liquid to be weighed, a cradle supporting the tank, a platform supporting the cradle and a frame supporting the platform, an outlet in the bottom of the tank adjacent one end thereof, said outlet having a depending portion, a valve in the outlet biased to normally closed position, a valve stem extending through the depending portion, a discharge fitting positioned on the frame beneath the depending portion and in substantial vertical alignment therewith, an actuating rod positioned in the fitting, said frame and fitting being formed with cooperating separable means to align the fitting and depending portion, a sealing gasket interposed between the depending portion and the upper end of the fitting, said fitting having an internal diameter greater than the external diameter of the depending portion, bearing elements on the tank and cradle remote from the outlet and a supporting shaft mounted in said elements to support the tank at one end thereof, a cam shaft rotatably mounted on the cradle adjacent the outlet end of the tank, cam elements secured to the cam shaft and adapted to engage the bottom of the tank, said cam elements having low, intermediate, and high lift portions, said cam elements and the actuating rod and gasket being so related that, when said low cam portions engage the tank the actuating rod engages the valve stem to open the valve and the sealing gasket is pressed between the depending portion and fitting to form a liquid tight joint, said intermediate cam portion when engaging the tank elevating the depending portion sufficiently to close the valve and enable the depending portion to float in the end of the fitting, said high lift portions when engaging the tank spacing the depending portion and fitting and rendering them manually accessible.

EDWARD J. MEROW.

REFERENCES CITED

The following references are of record in the file of this patent:

UNITED STATES PATENTS

| Number | Name | Date |
|---|---|---|
| 759,044 | Taylor | May 3, 1904 |
| 812,346 | Hedemann | Feb. 20, 1906 |
| 999,602 | Slee | Aug. 1, 1911 |
| 1,024,415 | Mosby | Apr. 23, 1912 |
| 1,973,709 | Hibbert et al. | Sept. 18, 1934 |
| 2,056,931 | Bannister | Oct. 6, 1936 |
| 2,400,084 | Fouke | May 14, 1946 |
| 2,453,080 | Shimp | Nov. 2, 1948 |